United States Patent [19]

Banning et al.

[11] Patent Number: 5,721,901
[45] Date of Patent: Feb. 24, 1998

[54] METHOD AND APPARATUS FOR DISPLAYING A DIALOG BOX ENABLING USER SELECTIONS FROM A DATABASE

[75] Inventors: Kenneth Ray Banning; Wendy Sue James; Shih-Gong Li, all of Austin, Tex.

[73] Assignee: International Business Machines Corporation, Armonk, N.Y.

[21] Appl. No.: 479,234

[22] Filed: Jun. 7, 1995

Related U.S. Application Data

[63] Continuation of Ser. No. 916,240, Jul. 20, 1992, abandoned.

[51] Int. Cl.$^6$ .................................................. G06F 3/00
[52] U.S. Cl. ........................ 395/604; 395/613; 395/968
[58] Field of Search ........................... 395/326–358, 395/603–605, 968, 613

[56] References Cited

U.S. PATENT DOCUMENTS

| | | | |
|---|---|---|---|
| 4,068,304 | 1/1978 | Beausoleil et al. | 364/200 |
| 4,087,794 | 5/1978 | Beausoleil et al. | 364/900 |
| 4,449,186 | 5/1984 | Kelly et al. | 364/407 |
| 4,464,652 | 8/1984 | Lapson et al. | 340/710 |
| 4,477,880 | 10/1984 | Advani et al. | 364/900 |
| 4,527,250 | 7/1985 | Galdun et al. | 364/900 |
| 4,531,918 | 7/1985 | Coquil et al. | 434/118 |
| 4,556,954 | 12/1985 | Advani et al. | 364/900 |
| 4,601,003 | 7/1986 | Yoneyama et al. | 364/518 |
| 4,635,208 | 1/1987 | Coleby et al. | 364/491 |
| 4,642,790 | 2/1987 | Minshull et al. | 364/900 |
| 4,648,062 | 3/1987 | Johnson et al. | 364/900 |
| 4,656,603 | 4/1987 | Dunn | 364/900 |
| 4,686,522 | 8/1987 | Hernandez et al. | 340/709 |
| 4,689,737 | 8/1987 | Grant | 364/200 |
| 4,712,191 | 12/1987 | Penna | 364/900 |
| 4,763,356 | 8/1988 | Day, Jr. et al. | 379/368 |
| 4,815,029 | 3/1989 | Barker et al. | 364/900 |
| 4,821,211 | 4/1989 | Torres | 364/521 |

(List continued on next page.)

OTHER PUBLICATIONS

Staes et al, "A Graphical Query Language for Object Oriented Databases", Oct. 1991, IEEE, pp. 205–210.
Czejdo et al, "Design and Implementation of an Interactive Graphical Query Interface for a Relational Database Management System", IEEE, 1989, pp. 14–20.
Chang, "Visual Reasoning for Information Retrieval from Very Large Databases", IEEE, 1989, pp. 1–6.
Advanced Interface Design Guide, 1989, pp. 77–81.
Angelaccio et al, "QBD*", IEEE, 1989, pp. 56–61.
Dahl et al, "Visual Programming as an Interface Between Program and User", IEEE, 1989, pp. 18–23.
Tsuda et al, "Iconic Browser", IEEE, 1989, pp. 130–137.

(List continued on next page.)

Primary Examiner—Raymond J. Bayerl
Assistant Examiner—John E. Breene
Attorney, Agent, or Firm—David A. Mims, Jr.; Keith Stephens

[57] ABSTRACT

A method, system and program for providing a graphical interface for a database are accomplished by the operation of a process in the memory of a processor. A selected entry in the database is dynamically used as input to a conditional definition dialog box. The definition of individual conditions, the definition of the relationship of conditions to the selected entries, the editing of conditions, and the editing of the relationship of conditions is simplified and rendered dynamic and interactive for the user thereby facilitating the completion of the task being performed. The user need not remember the related column information for a specified predicate because the system will provide that information simultaneously with the conditional definition in a form that supports the direct manipulation of the related information. The selected entries and their relationship are displayed simultaneously with the definition activities for both the initial definition and any subsequent editing activities. The user may select this information and drag it to the desired location to proceed on the desired activity.

10 Claims, 4 Drawing Sheets

U.S. PATENT DOCUMENTS

| | | | |
|---|---|---|---|
| 4,829,423 | 5/1989 | Tennant et al. | 364/200 |
| 4,843,538 | 6/1989 | Lane et al. | 364/188 |
| 4,853,843 | 8/1989 | Ecklund | 364/200 |
| 4,868,766 | 9/1989 | Oosterholt | 364/522 |
| 4,873,623 | 10/1989 | Lane et al. | 364/188 |
| 4,885,717 | 12/1989 | Beck et al. | 364/900 |
| 4,899,136 | 2/1990 | Beard et al. | 340/706 |
| 4,933,514 | 6/1990 | Bowers | 178/18 |
| 4,939,507 | 7/1990 | Beard et al. | 340/706 |
| 4,945,475 | 7/1990 | Bruffey et al. | 364/200 |
| 4,951,190 | 8/1990 | Lane et al. | 364/188 |
| 4,953,080 | 8/1990 | Dysart et al. | 364/200 |
| 4,984,152 | 1/1991 | Muller | 364/200 |
| 4,989,132 | 1/1991 | Mellender et al. | 364/200 |
| 4,996,654 | 2/1991 | Rosenow | 364/521 |
| 5,001,697 | 3/1991 | Torres | 364/521 |
| 5,040,131 | 8/1991 | Torres | 364/521 |
| 5,041,967 | 8/1991 | Ephrath et al. | 364/200 |
| 5,041,982 | 8/1991 | Rathnam | 364/443 |
| 5,088,052 | 2/1992 | Spielman et al. | 395/349 X |
| 5,175,814 | 12/1992 | Anick et al. | 395/349 X |
| 5,265,246 | 11/1993 | Li et al. | 395/349 X |

OTHER PUBLICATIONS

Hirakawa et al, "An Image Database System Facilitating Icon–Driven Spatial Information Definition and Retrieval", IEEE, Oct. 1991, pp. 192–198.

Burns et al, "A Graphical Entity–Relationship Database Browser", IEEE, Jan. 1988, pp. 694–704.

Rohr, "Graphical User Languages for Querying Information" IEEE, Oct. 1988, pp. 21–28.

Gardarin et al, "Extending a Relational DBMS to Support Complex Objects", IEEE, Oct. 1989, pp. 131–137.

IBM Tech. Discl. Bull., "Method of Detecting Atomic Boulean Factors", Oct. 1989, pp. 368–375.

Sian et al, "Visual Database Interface for End User Computing", IEEE, May 1992, pp. 393–396.

Tan et al, "A Graphical Knowledge Level Approach for User–Database Interaction", IEEE, Nov. 1990, pp. 453–458.

Batini et al, "Visual Strategies for Querying Databases", IEEE, Oct. 1991, pp. 183–189.

Catarci et al, "Iconic and Diagrammatic", IEEE, Oct. 1991, pp. 199–204.

IBM Technical Disclosure Bulletin, vol. 30, No. 1, Jun. 1987, Intelligent Scheduling, Query and Reporting Data Base, p. 376.

IBM Technical Disclosure Bulletin, Interactive Schema Diagram to Visually Represent Tables of Related Data and Meaningful Joins Between Tables, vol. 33, No. 9, Feb., 1991, pp. 243–246.

METHOD AND APPARATUS FOR DISPLAYING A DIALOG BOX ENABLING USER SELECTIONS FROM A DATABASE

This is a continuation of application Ser. No. 07/916,240 filed Jul. 20, 1992, abandoned.

FIELD OF THE INVENTION

This invention generally relates to improvements in database queries and more particularly to a graphical display for creating database queries of row conditions.

BACKGROUND OF THE INVENTION

Databases have become the subject of significant recent interest, not only because of the increasing volume of data being stored and retrieved by computerized databases but also by virtue of the data relationships which can be established during the storage and retrieval processes.

Structured Query Language (SQL), and in particular ANSI SQL, has become a preferred language media for communicating queries to relational databases. As a consequence, there presently exist thousands of relational databases and thousands of related queries directed to such databases. Given an investment in such databases and queries, migration is not only a desirable feature, but a substantially necessary capability for new relational database systems and methods.

The concept of portraying a query in a graphical depiction on a display screen of a workstation is a relatively new approach to relational database interfacing. Visual queries, often referred to as graphical queries, utilize workstation graphics to represent query objectives heretofore defined by SQL statements. A visual query presents a pictorial depiction of the objectives of a search, thereby eliminating any need for a user to learn a query language, improving the rate at which SQL queries can be formulated, and reducing the defect or error rate of queries.

With the growing prevalence of relational databases, communication networks and workstations, the training and experience of a representative system user has decreased in relation to the resources available. The dilemma created by these various events is threefold. First, there exists an established and valuable base of queries formulated with classical SQL expressions. Second, there is a growing usage of relational databases and networks accessing their information. The end users of such databases are routinely less proficient in the very tools needed to efficiently and accurately access the relational database information. Finally, users of database access methods do not receive direct feedback of changes based on their manipulation of the database. Thus, a distinct need exists for methods, systems and programs which convert query statements into visual representations understandable by novice database users, and, in the compliment, which convert graphically or visually represented queries into SQL format statements usable in existing databases and network environments.

An article by Faloutos, F., and Sellis, T., entitled, "An Efficient Pictorial Database System for PSQL", IEEE *Transactions on Software Engineering*, Vol. 14, No. 5, May 1988, discusses a prior art technique for searching a K or B-tree database using efficient data structures for optimizing the search. The report discusses access techniques for retrieving information and displaying the information on graphical displays. For example, demographic information can be used to retrieve information and format it graphically to reflect population in various sections of the United States. An improvement to further optimize the access of data for subsequent graphic display is disclosed in U.S. Pat. No. 4,905,163 and IBM Technical Disclosure Bulletin Vol. 30, No. 1, June 1987, *Intelligent Scheduling, Query and Reporting Data Base*.

An example of a dynamic, graphical display for a knowledge base application is found in U.S. Pat. No. 4,752,889 to Neuron Data. The patent discloses a graphical tree structure depiction of a knowledge base that is updated after changes are made to the database via user line commands.

In the prior art, there are various programs that allow users to define row conditions during the definition of a database query. For example, users have access to programs for defining queries that include the SQL WHERE clause. This input is a text string in a separate panel, or a string in the flow of the entire query command text. Users may enter the command language text in either form. This text requires user access to the keyboard, or other alphanumeric entry device.

All known current approaches have at least two problems. First, the row condition definition is not initialized with any information regarding the target column. Second, the text string is a keyboard only action that excludes the overwhelming trend in user interfaces to direct manipulation by means of a pointing device and selection.

The impact of these problems with current implementations is that extra time is required for users to define row conditions. The absence of the related column information causes delays and errors because human memory is relied upon to replicate information that is already known to the system. The user must switch from pointing device to keyboard and then back which introduces errors and delays. The current approaches do not aid the user in the performance of the action desired; i.e., the definition of the row conditions to achieve a desired subset of database records.

SUMMARY OF THE INVENTION

Accordingly, it is a primary object of the present invention to provide a unique method and system for the visual presentation of row database information using a graphical display and provide row condition definition using the graphical display.

According to the invention, the definition of row conditions, and the editing of row conditions is simplified and rendered dynamic and interactive for the user thereby facilitating the completion of the task being performed. The user need not remember the related column information for a specified condition because the system will provide that information simultaneously with the initialization of the condition definition in a form that supports the direct manipulation of the related information. The condition is displayed simultaneously with the definition activities for both the initial definition and any subsequent editing activities. The user may grab this information and drag it to the desired location to proceed on the desired activity.

The benefits of the invention include enhanced user performance on the row condition task by having direct manipulation of the related column information during the task. The user is also supported for direct manipulation of the sub-tasks that comprise the row condition definition task. The user is not required to memorize information that can be provided by the system. This makes the system easier to use by both novice and experienced users, and no matter what the skill level of the user, errors are reduced as a result of the graphical interface which provides only the valid operations for selected objects.

These and other objects of the present invention are accomplished by the operation of an algorithm in the memory of a processor. The processor accesses data structures to determine the current status of a database and displays the logical relationships of the information stored in the database graphically. A user employs a pointing device to select and change portions of the database and its logical relationships via the graphic user interface. The selection and changes are dynamically applied to the relational database via modifications to the underlying data structures and reflected graphically on the display. Additional, dynamic data structures, called presentation objects are created based on user created information defining relationships, new tables, groups, constraints, row conditions, having conditions, SQL statements, categories and sets of existing database information. The dynamic data structures can ultimately become part of the original database. The method, system and program is comprehensive in dynamic creation of data structures called presentation objects for use in the direct manipulation and change of a database.

DETAILED DESCRIPTION OF THE INVENTION

Queries which obtain information from relational databases are conventionally defined with ANSI standard Structure Query Language (SQL) statements. These statements define in computer recognizable terms the tables from which the data is to be extracted, the columns of interest, the conditions rows must satisfy, what columns are to be included, how the select columns are to be grouped, the order of the columns, distinctiveness constraints in the columns, connections of data within tables, and lower level or subqueries to be integrated into the base queries. A simple text describing SQL and its uses appears in the IBM Operating Systems/2 Extended Edition Database Manager Structured Query Language (SQL) Concepts booklet published by IBM Corporation in 1991. In addition to the ANSI standard SQL statements, there exist a number of nonstandard SQL statements within the relational database community. Thus, any bidirectional translation resource must have the diversity of structure to interface a broad spectrum of relational database SQL language variances.

As noted earlier, comprehensive bidirectionality of the translation is important from the perspective of migrating from established SQL queries to their graphical or visual query equivalents. It is inefficient to require the regeneration of existing SQL queries into the visual environment. At the same time, new visual queries should be available in SQL format for use on existing hardware with existing relational databases. Comprehensive bidirectionality and direct manipulation via a graphical display is lacking in the prior art.

Some technologies do exist for providing very limited translation from SQL to a visual or graphical depiction. Representative examples are described in "Graphical User Languages for Querying Information: Where to look for criteria?" by Hrohr, as published in 1988 *IEEE Workshop On Visual Languages*, May 1988, pages 14-20; "Design and Implementation of An Interactive Graphical Query Interface for a Relational Database Management System" by Czejdo et al, as appeared in 1988 *IEEE Workshop On Visual Languages*, May 1988 pages 21-28; and "End-User Access to Relational Databases Metaphor Database Server" by Benjamin et al, as appeared in the summer 1987 issue of InfoDB.

Unfortunately, the translations described in such publications were lacking both in comprehensive bidirectionality and scope of diversity. Namely, the focus was only directed toward translating from SQL to visual or graphical depictions. Furthermore, the translations were not ANSI standard SQL comprehensive, in that the row condition was incapable of handling diverse logical relationships, no mathematical relationships were permitted for column data, and subquery handling was absent. None of the teachings even remotely suggested the ability to directly manipulate a database directly from the graphic display. The article "User Interfaces for Structural Engineering Relational Database" by Howard et al as appeared in *Engineering With Computers*, 1988, pages 239-249, recognized the importance of bidirectional translation between a text based query, the defined Engineering Query Language and graphical representations. However the article did not disclose how such desirable objectives could be accomplished. The article recognized the potential need for translating relatively complex query formulations and applying them directly from a graphical interface to a database, but made no attempt to present a solution. In contrast, the present invention defines a method, system and program for accomplishing these desirable goals and doing so with the resources to handle complex formulations, including, but not limited to, the definition of complex logical and algebraic relationships between columns and the manipulation of hierarchical queries composed of subqueries.

Figure 1A:
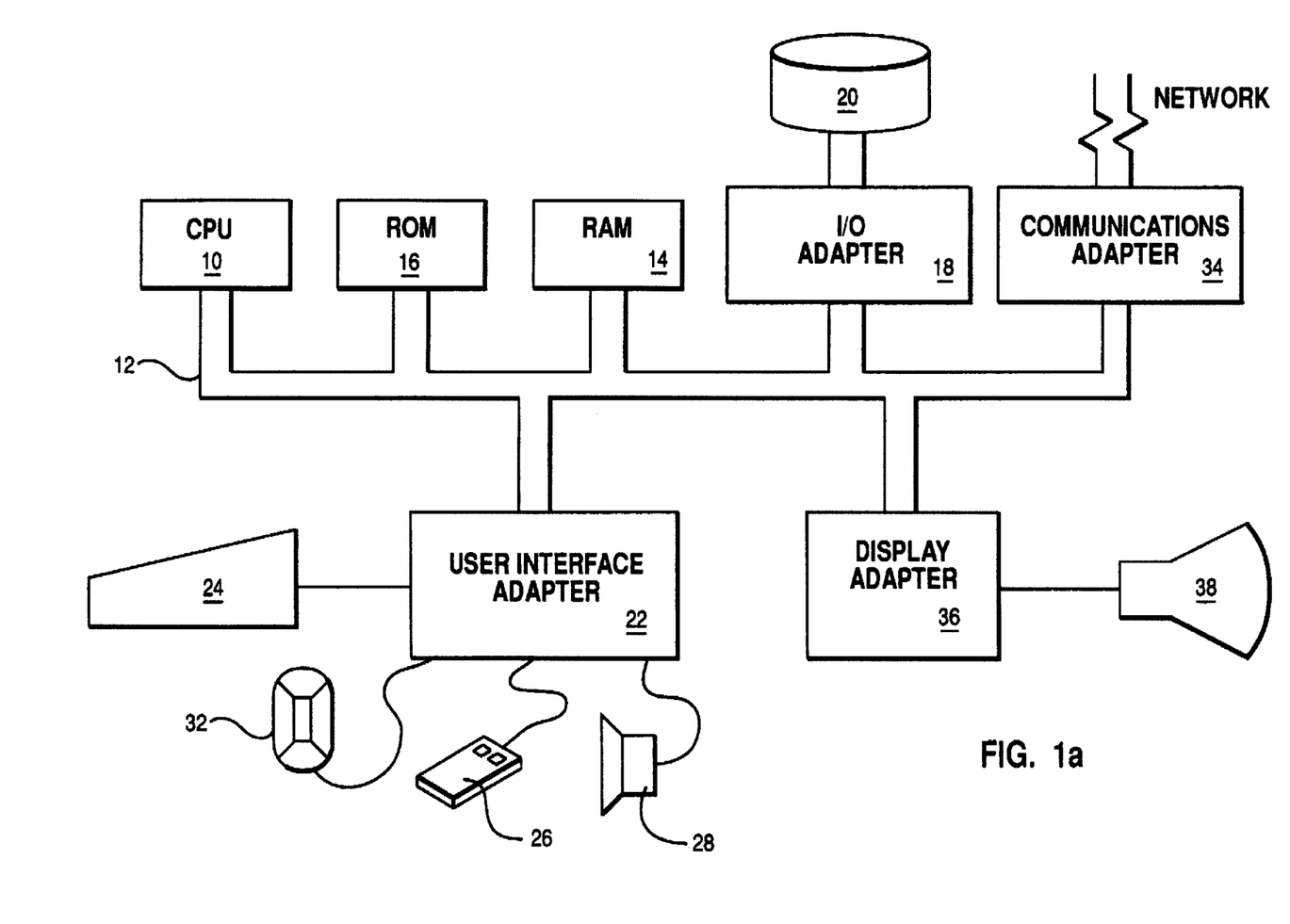
FIG. 1a is a block diagram of a personal computer system in accordance with the subject invention.

The invention is preferably practiced in the context of a relational database such as is available in the OS/2 Extended Edition software program available from IBM Corporation. A representative hardware environment is depicted in FIG. 1a, which illustrates a typical hardware configuration of a workstation in accordance with the subject invention having a central processing unit 10, such as a conventional microprocessor, and a number of other units interconnected via a system bus 12. The workstation shown in FIG. 1a includes a Random Access Memory (RAM) 14, Read Only Memory (ROM) 16, an I/O adapter 18 for connecting peripheral devices such as disk units 20 to the bus, a user interface adapter 22 for connecting a keyboard 24, a mouse 26, a speaker 28, a microphone 32, and/or other user interface devices such as a touch screen device (not shown) to the bus, a communications adapter 34 for connecting the workstation to a data processing network and a display adapter 36 for connecting the bus to a display device 38.

Figure 1B:
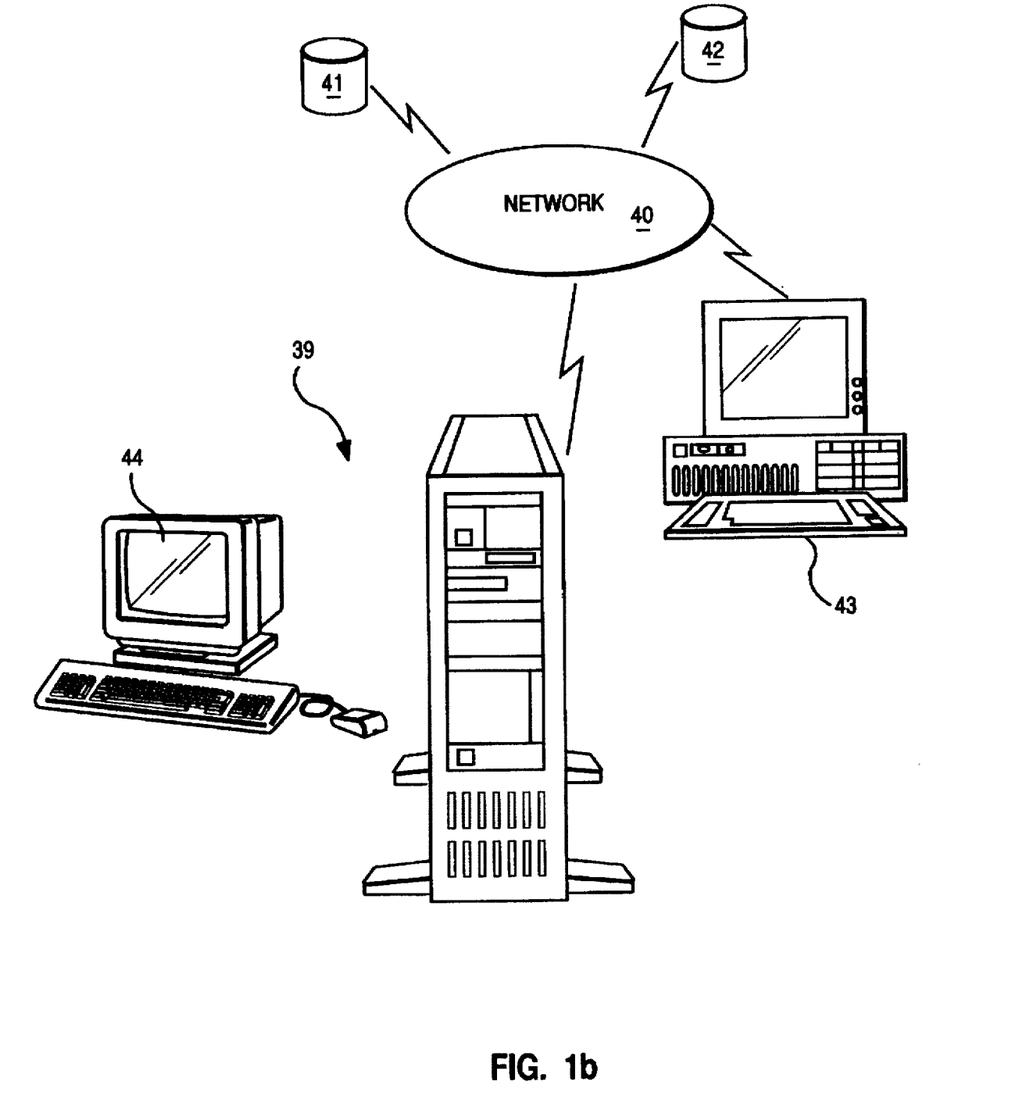
FIG. 1b schematically depicts a workstation connected to a network with a relational database in accordance with the subject invention.

A network of workstations, including an IBM brand PS/2 workstation, is illustrated in FIG. 1b, having resident thereon the OS/2 Extended Edition base operating system and the aforementioned OS/2 Extended Edition relational database program. Workstation 39 includes nonvolatile storage for the database, such as a hard disk, optical disk or tape drive media, and means for communicating into a network, generally at 40, having attached thereto further databases 41 and 42 as well as distinct non-proximate workstations such as 43. The fundamental goal is to provide a relatively inexperienced relational database user of workstation 39 with a method, system and program resources to create, modify and execute relational database queries encompassing a broad and historical base of information. The invention further contemplates that preexisting queries formulated in classical SQL format be conveyed to workstation 39 and subjected to conversion into visual or graphical queries equivalent for display on a graphic display 44. The user thereafter refines the query, executes the query and dynamically views the results on the graphic display.

A basic tenet of the user interface architecture for Structured Query Language (SQL) queries is that unlike the computer with it's mathematical language and rigid parsing rules, humans use categories to organize information and understand relationships between objects. An object is any actual entry in a relational database. The information necessary for the computer to perform a query of a relational database using SQL is visually structured into related objects with the text representing the objects of interest and the graphical representation of these objects depicting the relationships that exist or are of interest to the requester. The reader is referred to IBM's *SQL REFERENCE,* SC26-4380 pl (1989) for a detailed description of statements in the Structured Query Language (SQL). These statements include create, alter, and drop objects; retrieve, insert, update, and delete data in them; and grant and revoke privileges over them. The publication gives a complete description of all SQL elements and an alphabetic list of all SQL statements implemented by IBM, with descriptions of their syntax, options, and effects.

In defining the row condition (Where condition) for a SQL query, the user usually needs to specify a set of conditions (predicates) as building blocks of the row condition. Each predicate involves column(s) comparison. More likely, the column comparison is comparing a column against a value, another column, or a column expression.

The present invention provides a method that exploits this special characteristic to reduce the complexity in defining a predicate for the row condition.

Figure 2:
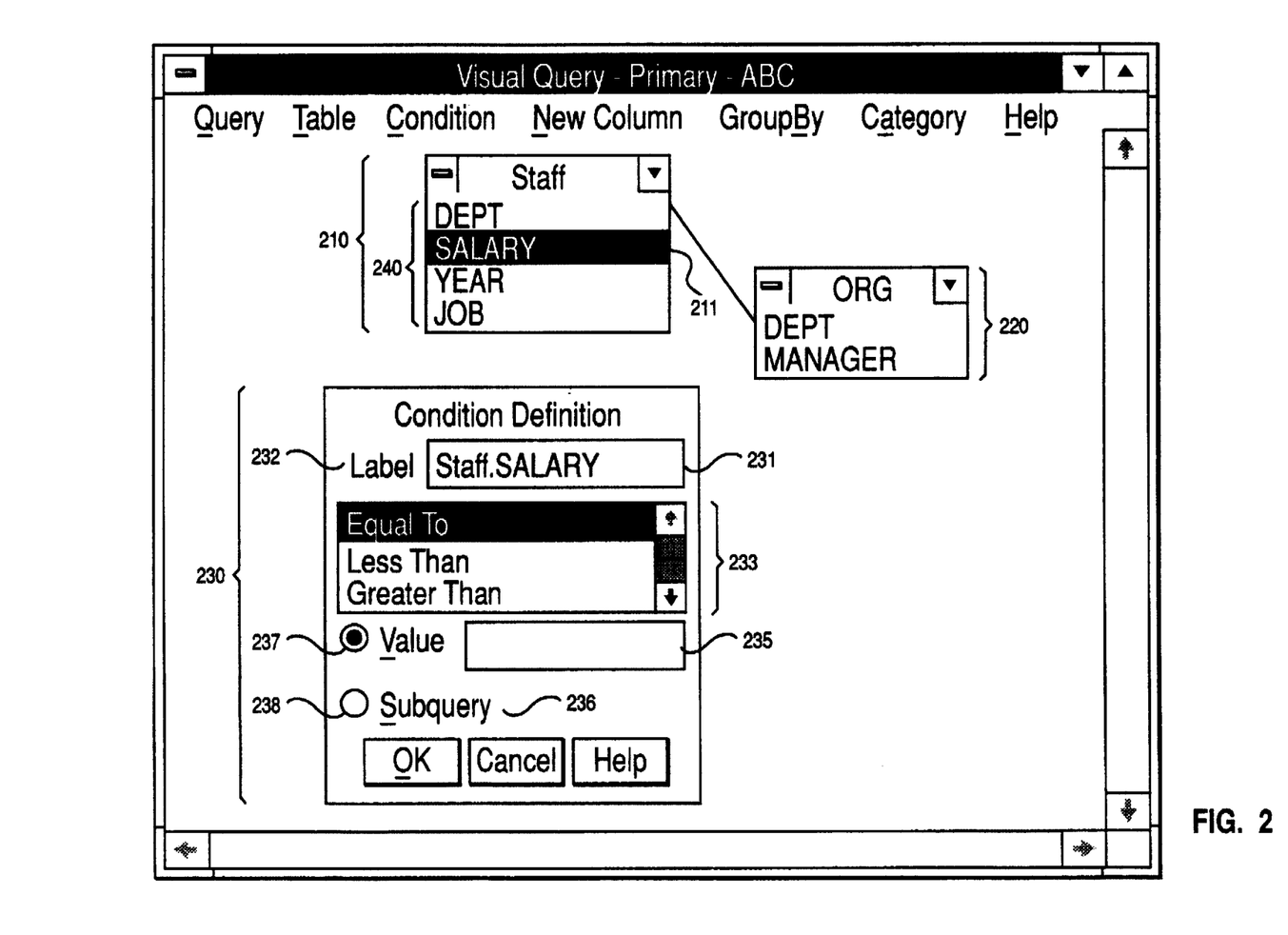
FIG. 2 is an illustration of visual query displays in accordance with the subject invention.

FIG. 2 shows a user interface design of Visual Query. The Staff 210 and ORG 220 are windows of tables referenced in a SQL query definition. The contents of each table window is the list of columns, such as 240 in table window Staff 210, belonging to the table. The user can double click a column entry in a table window to define a predicate based on the clicked column. When a column entry is double clicked, a dialog box, such as the Condition Definition dialog box 230 shown in FIG. 2, will be displayed for defining a predicate against the column. As the dialog box is displayed initially, the full name (TableName.ColumnName) of the clicked column is automatically transferred into the entry field of Label. For example, when column SALARY 211 is double clicked, the dialog box 230 will be displayed with the text "Staff.SALARY" in the entry field 231 for Label definition 232. A complete predicate is composed of three parts: the left side (Label), the Comparison Operator, and the right side (a value or a subselect statement for nesting subqueries). The interface of the present invention will automatically fill in the Label, so the user does not need to type in the name of the column for comparison. The possible comparison operators are listed in a scrollable list box 233.

The user can use a pointing device to select the appropriate operator without using the keyboard. In addition, if the right side is another column or a subquery, this user interface also allows the user to enter the appropriate information by direct manipulation techniques, such as dragging a column name to the entry field 235 for Value 237 or a subquery icon (if available) to the Subquery field 238.

The present invention can provide automatic input of the initial information for defining a predicate against a column. This automatic, dynamic information exchange can facilitate the process for defining a predicate and reduce the possibility of user errors.

The user can use a pointing device to select the appropriate operator without using the keyboard. In addition, if the right side is another column or a subquery, this user interface also allows the user to enter the appropriate information by direct manipulation techniques, such as dragging a column name to the entry field 235 for Value 237 or a subquery icon (if available) to the Subquery field 238.

The present invention can provide automatic input of the initial information for defining a predicate against a column. This automatic, dynamic information exchange can facilitate the process for defining a predicate and reduce the possibility of user errors.

Pseudo Code In Accordance With the Subject Invention

```
/* Double Clicking on a Column Name in a Table window */
response to Double_Click(Column)
    /* identify the column object            */
    /* transfer the column object's full name into DlgLbl */
    copy object.Table to XTbl
    copy object.Column to XClmn
    copy "Xtbl.Xclmn" to DlgLbl
    /* call the procedure for defining predicates */
    call PCondDefProc(DlgLbl)
    Return subroutine PCondDefProc(DlgLbl) is
    /* Dialog Box Initialization */
    copy DlgLbl to Label
    copy 1 to Operator
```

```
            copy "" to RhsValue
            copy "" to RhsSub
            copy 120 to XP
            copy 40 to YP
 5          copy false to DidOKDlg
            /* Call the procedure to open the dialog box for defining a predicate
   */
            call OpenDialogBox2(XP,YP,Label,Operator,RhsValue,RhsSub)
            if (DidOKDlg) then
10              /* A predicate has been defined thru committing the dialog box */
                /* Get the text for the chosen comparison operator */
                call GetTOP(Operator,TOP)
                /* Build the text for the defined predicate */
                copy Label to PTObj
15              append TOP to PTObj
                if (not(RhsValue="")) then
                    append RhsValue to PTObj
                else
                    append RhsSub to PTObj
20              end if
                /* Prepare for displaying the defined predicate */
                /* TempL is the number of characters in */
                /* the text of the defined predicate    */
                copy length of PTObj to TempL
25              copy (8*TempL) to TempL
                /* Ipred is the next available index for a predicate */
                /* Assign this newly defined predicate with index Ipred */
                /* and store the predicate's information for subsequent operations
   */
30              copy Label to L[Ipred]
                copy Operator to O[Ipred]
                copy RhsValue to V[Ipred]
                copy RhsSub to S[Ipred]
                /* Determine the screen location for displaying this predicate */
35              Find a screen location (XP,YP) in the Row Condition window
                /* PObj is a defined object for displaying predicate */
```

```
     /* in the Row Condition window */
     change PObj position to XP YP
     /* Prepare PObj for displaying on the screen */
     enable PObj
5    make PObj parameter PTObj
     make PObj black
     change graphics PObj to
             box TempL 9
             move to 0 1
10           text PTObj
     if (First) then
         /* First is a boolean variable initially TRUE */
         /* The Row Condition window becomes visible  */
         /* after the first predicate is defined      */
15       make ConnWindow visible
         copy false to First
     end if
     make PObj visible
     /* Initially, the default is to link all defined predicates by AND */

20   if (Default) then
         /* ANDCon is a predefined object representing */
         /* the root AND operator in the Row Condition window */
         make ANDCon visible
         /* Create an object to link the display of */
25       /* the defined predicate and ANDCon object */
         copy the coordinate of the right middle corner of ANDCon to
     (XL,YL)
         copy the coordinate of the left middle point of PObj to (XR,YR)
         change LinkObj position to XL YL
30       change graphics LinkObj to
             line (XR-XL) (YR-YL)
         /* Display the link line in black */
         make LinkObj black
         make LinkObj visible
35   end if
```

```
            make RhsSubKey invisible
        else
            make RhsVaKey  invisible
        end if
5       Return subroutine QueryDialogBox2( string : Label, integer : Operator,
        string : RhsValue, string : RhsSub ) is
        copy text of LabelKey in DialogBox2 to Label
10      copy ( selected line from OpKey in DialogBox2 ) to Operator
        if (Value is checked) then
            copy text of RhsVaKey in DialogBox2 to RhsValue
            copy "" to RhsSub
        else
15          copy text of RhsSubKey in DialogBox2 to RhsSub
            copy "" to RhsValue
        end if
        Return
```

```
            /* single click on a column name */
            copy Object.Column to Temp
            Do Case
               Case CursorValue = 0
                   /* if last cursor position in Label field */
                   copy text of LabelKey in DialogBox2 to TempText
                   append Temp to TempText
                   change LabelKey in DialogBox2 text to TempText
               Case CursorValue = 1
                   /* if last cursor position in Value field */
                   change RhsVaKey in DialogBox2 text to Temp
            End Case
         response to Drag_drop(QueryIcon, Subquery)
            /* Drag a query icon and drop in the Subquery entry field */ copy Object.Query to Temp
            change RhsSubKey in DialogBox2 text to Temp
         response to OK in DialogBox2
            call QueryDialogBox2(Label,Operator,RhsValue,RhsSub)
            copy true to DidOKDlg
            make DialogBox2 invisible
            leave block
         response to Cancel in DialogBox2
            copy false to DidOKDlg
            make DialogBox2 invisible
            leave block
      end
      Return subroutine SetupDialogBox2( string : Label, integer : Operator,
         string : RhsValue, string : RhsSub ) is
         change LabelKey in DialogBox2 text to Label
         select line Operator in OpKey in DialogBox2
         change RhsVaKey in DialogBox2 text to RhsValue
         change RhsSubKey in DialogBox2 text to RhsSub
         if ( RhsSub="" ) then
```

```
            make RhsSubKey invisible
        else
            make RhsVaKey  invisible
        end if
5       Return subroutine QueryDialogBox2( string : Label, integer : Operator,
            string : RhsValue, string : RhsSub ) is
            copy text of LabelKey in DialogBox2 to Label
10          copy ( selected line from OpKey in DialogBox2 ) to Operator
            if (Value is checked) then
                copy text of RhsVaKey in DialogBox2 to RhsValue
                copy "" to RhsSub
            else
15              copy text of RhsSubKey in DialogBox2 to RhsSub
                copy "" to RhsValue
            end if
            Return
```

FLOWCHARTS IN ACCORDANCE WITH THE SUBJECT INVENTION

Figure 3:
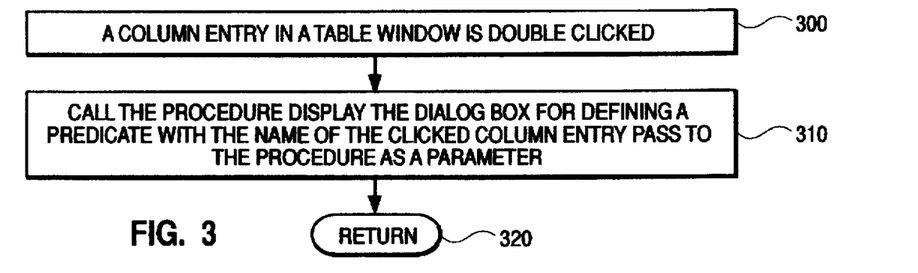
FIGS. 3 and 4 are detailed flowcharts in accordance with the subject invention.
Figure 4:
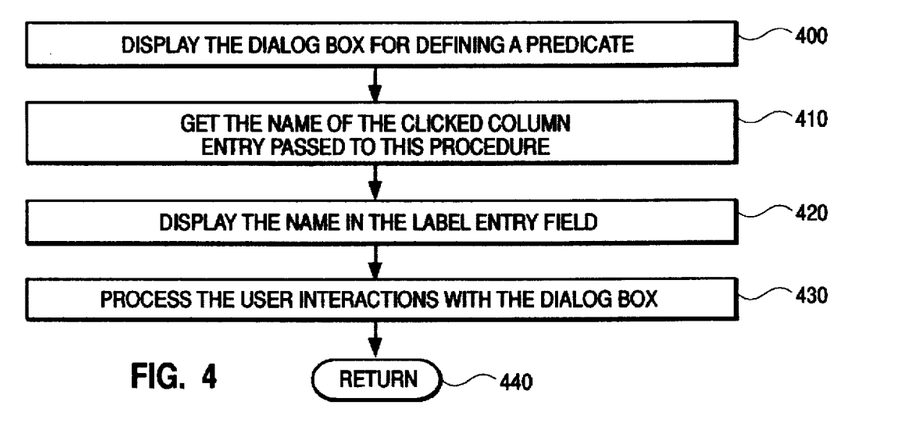
Figure 5:
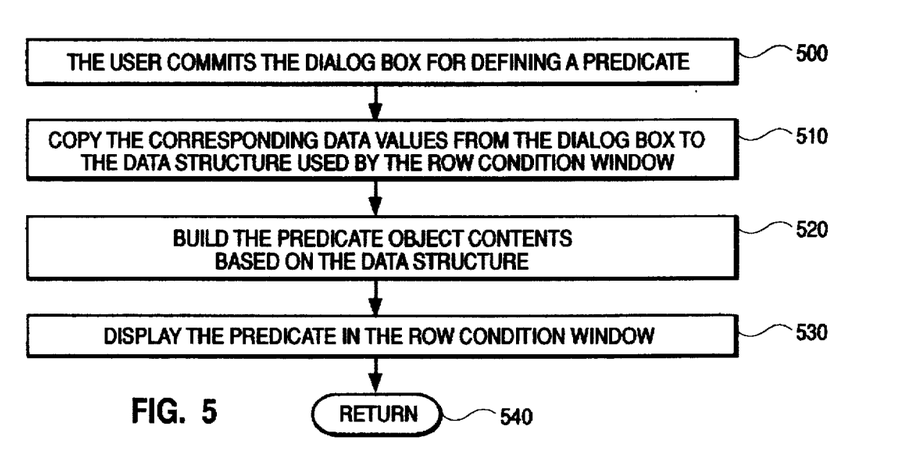
FIG. 5 is the detailed logic for committing the dialog box selections in accordance with the subject invention.

FIGS. 3, 4 and 5 are flowcharts in accordance with the subject invention. Processing commences at function block 300 of FIG. 3 where a column entry is selected. Then, at function block 310, a dialog box is presented to prompt a user for predicate definitions based on the selected column entry. Control is then returned to the calling program at terminal 320. FIG. 4 completes the processing commencing with function block 400 which displays the dialog box for defining a predicate. The dialog box is as shown at label 230 of FIG. 2. After the dialog box is displayed at function block 400, the name of the selected column entry is obtained as shown in function block 410, and the name of the selected column entry is displayed in accordance with function block 420 and illustrated at label 231 of FIG. 2. Then, at function block 430, the user selections in the dialog box are processed and control is returned to the calling program at terminal 440.

FIG. 5 is the detailed logic for committing the dialog box selections in accordance with the subject invention. At function block 500, a dialog box commit is initiated based on a user selection. Then, at function block 510, the corresponding data values from the dialog box are copied to the data structure used by ROW CONDITION. Then, at function block 520, the predicate object contents are built based on the ROW CONDITION data structure and the predicate is displayed in the ROW CONDITION window at function block 530 and control is returned to the calling program at terminal 540.

While the invention has been described in terms of a preferred embodiment in a specific system environment, those skilled in the art recognize that the invention can be practiced, with modification, in other and different hardware and software environments within the spirit and scope of the appended claims.

Having thus described our invention, what we claim as new, and desire to secure by Letters Patent is:

1. A method of creating a query for accessing a database by a user using a graphical user interface at a workstation in a data processing system, comprising:

selecting a column entry in said database by said user using a pointer device;

automatically transferring said column entry from said database into a dialog box representing a first field in a predicate in said graphical interface;

providing a comparison operator having a plurality of values in said graphical user interface and selecting one of said values by said user using said pointer device; and inputting a second column entry from said database into a second field in said dialog box in said graphical user interface by dragging said second column entry from said database to complete said predicate.

2. The method of claim 1 wherein the comparison operator values are listed in a scrollable list.

3. The method of claim 1 wherein the step of inputting includes the step of dragging a subquery into said second field in said dialog box in said graphical user interface to complete said predicate.

4. The method of claim 1 wherein the step of inputting includes the step of typing a value by said user using said keyboard by said user in said dialog box in said graphical user interface.

5. The method of claim 1 wherein said query is dynamically applied to said database such that underlying data structures of said database are modified.

6. A computer program product for creating a query for accessing a database by a user using a graphical user interface at a workstation in a data processing system, comprising:

a computer usable medium having computer readable program code means embodied in said medium for selecting a column entry in said database by said user using a pointer device;

computer readable program code means for automatically transferring said column entry from said database into a dialog box representing a first field in a predicate in said graphical interface;

computer readable program code means for providing a comparison operator having a plurality of values in said graphical user interface and selecting one of said values by said user using said pointer device; and computer readable program code means for inputting a second column entry from said database into a second field in said dialog box in said graphical user interface by dragging said second column entry from said database to complete said predicate.

7. A computer program product of claim 6 wherein the comparison operator values are listed in a scrollable list.

8. A computer program product of claim 6 wherein the computer readable program means of inputting includes means of dragging a subquery into said second field in said dialog box in said graphical user interface to complete said predicate.

9. The computer program product of claim 6 wherein the computer readable program code means of inputting includes means of typing a value by said user using said keyboard by said user in said dialog box in said graphical user interface.

10. The computer program product method of claim 6 wherein said query is dynamically applied to said database such that underlying data structures of said database are modified.

* * * * *

UNITED STATES PATENT AND TRADEMARK OFFICE
CERTIFICATE OF CORRECTION

PATENT NO : 5,721,901
DATED : Feb. 24, 1998
INVENTOR(S): Banning et al

It is certified that error appears in the above-identified patent and that said Letters Patent is hereby corrected as shown below:

Column 7 and 8, please delete lines 1-15;
Column 13 and 14, please delete lines 1-18, and insert

```
--Return
subroutine OpenDialogBox2(integer:XP, integer:YP, string:Label,
            integer:Operator, string:RhsValue, string;RhsSub) is
    copy false to DidOKDlg
    call ProcessDialogBox2( DidOKDlg)
    Return subroutine ProcessDialogBox2( boolean : DidOKDlg ) is
    began guarded
        response to start
            / cursor's initial position in Label entry field /
            copy 0 to CursorValue
            make DialogBox2 visible
            / Display the dialog box according to /
            / the predefined initial values /
            call SetupDialogBox2( Label, Operator, RhsValue,RhsSub)
            / set up the right radio button /
            if (RhsSub="") then
                check Value
                make RhsVaKey visible
            else
                check Subquery
                make RhsSubKey visible
            end if
```

UNITED STATES PATENT AND TRADEMARK OFFICE
CERTIFICATE OF CORRECTION

PATENT NO : 5,721,901
DATED : Feb. 24, 1998
INVENTOR(S): Banning et al

It is certified that error appears in the above-identified patent and that said Letters Patent is hereby corrected as shown below:

```
response to Value
       /  indicate the last cursor position was in Value  /
       copy 1 to CursorValue
       make RhsVaKey visible
       make RhsSubKey invisible
response to Subquery
       /  indicate the last cursor position was in Subquery  /
       copy 2 to CursorValue
       make RhsSubKey visible
       make RhsVaKey invisible
response to Single_Click(Column)
```

Signed and Sealed this

Twenty-ninth Day of June, 1999

Q. TODD DICKINSON

*Attest:*

*Attesting Officer*     *Acting Commissioner of Patents and Trademarks*